United States Patent [19]

Inagaki et al.

[11] Patent Number: 5,171,731
[45] Date of Patent: Dec. 15, 1992

[54] INFORMATION RECORDING MEDIUM

[75] Inventors: Yoshio Inagaki, Kanagawa; Takashi Kobayashi, Shizuoka, both of Japan

[73] Assignee: Fuji Photo Film Co., Ltd., Kanagawa, Japan

[21] Appl. No.: 723,095

[22] Filed: Jun. 28, 1991

[30] Foreign Application Priority Data

Jun. 29, 1990 [JP] Japan .................................. 2-171624
Jun. 29, 1990 [JP] Japan .................................. 2-172184

[51] Int. Cl.$^5$ ........................ B41M 5/035; B41M 5/26
[52] U.S. Cl. .................................. 503/227; 428/195; 428/913; 428/914; 548/302.4; 548/302.7
[58] Field of Search ................... 8/471; 428/195, 913, 428/914; 503/227; 548/324

[56] References Cited

FOREIGN PATENT DOCUMENTS 2050187 3/1987 Japan .................................. 503/227

*Primary Examiner*—B. Hamilton Hess
*Attorney, Agent, or Firm*—Sughrue, Mion, Zinn, Macpeak & Seas

[57] ABSTRACT

The information recording medium of the invention comprises a substrate and a recording layer for recording information by a laser beam, and the recording layer contains a cyanine dye having the following formula (I):

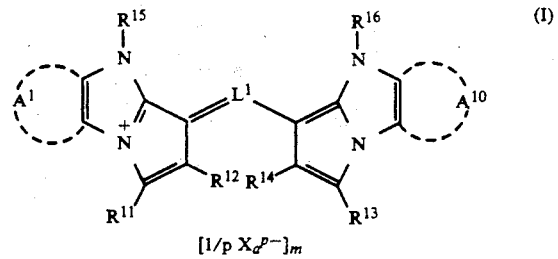

wherein each of $A^1$ and $A^{10}$ is an atom group for completing an aromatic ring which may have one or more substituents; $L^1$ is a methine group which may have one or more substituents or a trivalent connecting group of conjugated 3, 5 or 7 methines which may have one or more substituents; each of $R^{11}$, $R^{12}$, $R^{13}$ and $R^{14}$ is a hydrogen atom, or an alkyl, phenyl, acyl, alkoxy or 5- or 6-membered heterocyclic group which may have one or more substituents; each of $R^{15}$ and $R^{16}$ is an alkyl group which may have one or more substituents and one of said substituents may have an anionic moiety; $X_d^{p-}$ is an anion; p is 1, 2 or 3, m is 1 or 0; and m is 0 when $R^{15}$ or $R^{16}$ has a substituent having an anionic moiety.

4 Claims, No Drawings

INFORMATION RECORDING MEDIUM

BACKGROUND OF THE INVENTION

1. Field of the Invention

The present invention relates to an information recording medium having a recording layer of a cyanine dye for recording information by means of a laser beam having a high energy density and further relates to a novel cyanine dye employable for the information recording medium.

2. Description of Prior Art

An optical disc capable of recording information only once is referred to "DRAW" (Direct Read After Write), and studies on the optical disc have been made.

The optical disc of DRAW-type basically comprises a disc-shaped substrate made of a plastic material or a glass material and a recording layer made of a metal such as Bi, Sn, In and Te, a semi-metal or a dye such as a cyanine dye, a metal complex dye or a quinone dye, which is provided on the substrate. On the surface of the substrate where the recording layer is to be provided, an intermediate layer may be provided to improve surface smoothness of the substrate and to enhance adhesion between the substrate and the recording layer or sensitivity of the resulting optical disc. Writing (i.e., recording) of information on the optical disc can be carried out by irradiating the disc with a laser beam. The irradiated area of the recording layer of the optical disc absorbs energy of the laser beam and rise of temperature locally occurs, and as a result, a chemical or physical change (e.g., formation of pits) is caused to alter (or change) optical characteristics of the recording layer in the irradiated area, whereby information is recorded on the recording layer. Reading (i.e., reproduction) of information from the optical disc is also carried out by irradiating the disc with a laser beam, that is, the recorded information is reproduced by detecting a reflected light or a transmitted light corresponding to the change in the optical characteristics of the recording layer.

As a material (i.e., recording material) for forming the recording layer of the information recording medium, metals and dyes (e.g., cyanine dye) are generally known, as described above. An information recording medium using a dye as a recording material has a merit in the characteristics of an information recording medium, for example, the information recording medium has a higher sensitivity than the information recording medium using a metal as a recording material. In addition, the recording medium using a dye has such an advantageous feature in productivity that the recording layer can be easily formed on the substrate by a conventional coating method. For these reasons, dyes employable for such optical disc have been developed and put into practical use. The properties required for the dyes in application to the optical disc are for example as follows: property of absorbing a light in the wavelength region of 700 to 900 nm, that is a wavelength region of a semiconductor laser; relatively large absorption factor; and high reflectance. Recently, studies on enlarging of the wavelength region of a semiconductor laser or improvement and development of an optical disc drive have been made, and in accordance therewith, increase in number of dyes employable for the optical disc and variation thereof are expected. Therefore, it is desired that various kinds of dyes employable for the optical disc are developed.

The recording layers made of the above-mentioned dyes have such problem in optical characteristics that the layer generally has low reflectance and low C/N of the reproduced signals. Further, such dye recording layer easily deteriorates with lapse of time owing to irradiation with a light.

Japanese Patent Provisional Publication No. 64(1989)-40382 discloses an optical disc having a recording layer made of a cyanine dye having benzoindolenine structure as a dye recording layer improved in the above-mentioned reflectance and C/N. An information recording medium having such dye recording layer is relatively high in C/N, but is unsatisfactory in the reflectance and weathering resistance.

For enhancing a reflectance of the information recording medium, a method of further providing a reflecting layer on the dye recording layer is generally made, and an example of the information recording medium having a reflecting layer on the dye recording layer is described in "Nikkei Electronics", p. 107, Jan. 23, 1989. In the publication, although dyes used for the recording layer of the information recording medium are not apparent, recording of information on the recording layer is described as follows. That is, when the dye recording layer absorbs a laser beam to melt the dye of the layer, the plastic substrate is heated to protrude on the dye recording layer side to form pits, so as to record information on the recording layer. The reflecting layer provided in this information recording medium is a layer of Au-deposited film. According to the study of the present inventors, in the case that the above-mentioned cyanine dye having benzoindolenine structure is used for the dye recording layer, an optical disc having a high C/N and improved reflectance is obtained.

In the optical disc of DRAW-type, high-density recording of CD format signals (i.e., CD-DRAW) is necessarily made at a low linear speed of 1.2 to 1.4 m/sec, and the recorded signals are required to be reproduced using commercially available CD players. In the case of reproducing the recorded signals using the CD players, the optical disc is desired to have a reflectance of not less than 70%. However, even if CD format signals are recorded on the optical disc having a recording layer made of a cyanine dye having the above-mentioned benzoindolenine structure and a reflecting layer on the recording layer, some of the commercially available CD players cannot reproduce the recorded signals.

Accordingly, it is desired to produce optical discs having a markedly high reflectance (approx. 80%) which are employable as the above-mentioned CD-DRAW type discs.

SUMMERY OF THE INVENTION

It is an object of the invention to provide an information recording medium having a recording layer made of a cyanine dye.

It is an another object of the invention to provide an information recording medium which has a recording layer made of a cyanine dye and is prominently improved in C/N and reflectance.

It is a further object of the invention to provide an information recording medium which has a recording layer made of a cyanine dye and shows excellent weathering resistance in addition to prominently enhanced C/N and reflectance.

It is a still further object of the present invention to provide a novel cyanine dye (polymethine compound) employable for an information recording medium.

There is provided by the present invention an information recording medium comprising a substrate and a recording layer for recording information by means of a laser beam which is provided on the substrate, in which the recording layer contains a cyanine dye having the formula (I):

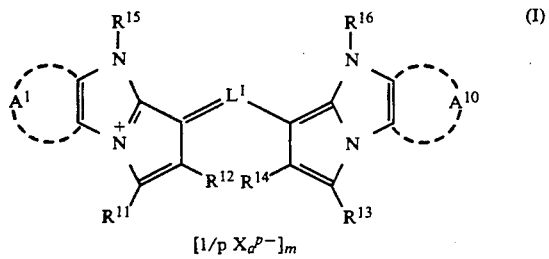

$[1/p \; X_a{}^{p-}]_m$ wherein each of $A^1$ and $A^{10}$ is an atom group for completing an aromatic ring which may have one or more substituents; $L^1$ is a methine group which may have one or more substituents or a trivalent connecting group of conjugated 3, 5 or 7 methines which may have one or more substituents; each of $R^{11}$, $R^{12}$, $R^{13}$ and $R^{14}$ is a hydrogen atom, or an alkyl, phenyl, acyl, alkoxy or 5- or 6-membered heterocyclic group which may have one or more substituents; each of $R^{15}$ and $R^{16}$ is an alkyl group which may have one or more substituents and one of said substituents may have an anionic moiety; $X_a{}^{p-}$ is an anion; p is 1, 2 or 3; m is 1 or 0; and m is 0 when $R^{15}$ or $R^{16}$ has a substituent having an anionic moiety.

Preferred embodiments of the information recording medium of the present invention are as follows.

1) The information recording medium wherein each of $A^1$ and $A^{10}$ in the above formula (I) is an atom group for completing a benzene or naphthalene ring which may be substituted with a halogen atom, a haloganated alkyl group of 1–4 carbon atoms, a cyano group or an alkoxycarbonyl group of 1–4 carbon atoms.

2) The information recording medium wherein $L^1$ in the above formula (I) is a trivalent connecting group of 3 or 5 methines which may be substituted with a halogen atom, an alkyl group of 1–4 carbon atoms (the alkyl group may be bonded to other methine group to form a ring), a benzyl group or a phenyl group.

3) The information recording medium wherein each of $R^{11}$, $R^{12}$, $R^{13}$ and $R^{14}$ in the above formula (I) is an unsubstituted alkyl group of 1–8 carbon atoms, an unsubstituted phenyl group, or a naphthyl group.

4) The information recording medium wherein each of $R^{15}$ and $R^{16}$ in the above formula (I) is an alkyl group of 1–18 carbon atoms which may be substituted with an alkoxy group of 1–4 carbon atoms, an alkylthio group of 1–4 carbon atoms, an alkoxycarbonyl group of 1–4 carbon atoms, a sulfonyl group of 1–4 carbon atoms, a halogen atom or a hydroxy group.

5) The information recording medium wherein $X_a{}^{p-}$ in the above formula (I) is a halogen ion, a sulfonate ion, $ClO_4{}^-$, $BF_4{}^-$, a metal complex ion, or a phosphoric acid ion.

6) The information recording medium wherein wherein each of $A^1$ and $A^{10}$, $R^{11}$ and $R^{13}$, $R^{12}$ and $R^{14}$, and $R^{15}$ and $R^{16}$ in the formula (I) of the cyanine dye is the same as each other, $A^1$ and $A^{10}$ are atom groups for completing a benzene ring which has one or more substituents or a naphthalene ring which may have one or more substituents, and $R^{11}$, $R^{13}$, $R^{12}$ and $R^{14}$ are hydrogen atoms, alkyl groups which may have one or more substituents or phenyl groups which may have one or more substituents. This cyanine dye can be represented by the formula (II) as described below.

7) The information recording medium wherein a reflecting layer made of a metal is provided on the recording layer.

8) The information recording medium wherein the recording layer is made of a mixture of a cyanine dye having the above formula (I) and a dye having absorption maximum on the longer wavelength side than the absorption maximum of the.

9) The information recording medium wherein the recording layer further contains a quencher having absorption maximum on the longer wavelength side than the absorption maximum of any dye contained in the recording layer.

10) The information recording medium as described in the above embodiment 8) wherein the absorption maximum of the dye is longer than the absorption maximum of the cyanine dye having the above formula (I) by not less than 20 nm.

11) The information recording medium wherein the absorption maximum of the cyanine dye is located on the longer wavelength side than 650 nm.

12) The information recording medium wherein a material of the substrate is plastic.

13) The information recording medium as described in the above embodiment 7) wherein the metal of the reflecting layer is selected from the group consisting of Cr, Ni, Pt, Cu, Ag, Au, Al and a stainless steel.

The terms "absorption maximum of a dye" means absorption maximum of a dye recording layer formed on the substrate.

As described above, the preferred cyanine dye has the formula (II):

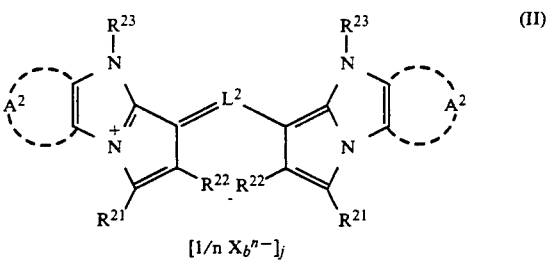

$[1/n \; X_b{}^{n-}]_j$ wherein $A^2$ is an atom group for completing a benzene ring which has one or more substituents or a naphthalene ring which may have one or more substituents; $L^2$ is a methine group which may have one or more substituents or a trivalent connecting group of conjugated 3, 5 or 7 methines which may have one or more substituents; each of $R^{21}$ and $R^{22}$ is a hydrogen atom, an alkyl group which may have one or more substituents or a phenyl group which may have one or more substituents; $R^{23}$ is an alkyl group which may have one or more substituents and one of said substituents may have an anionic moiety; $X_b{}^{n-}$ is an anion; n is 1, 2 or 3; j is 1 or 0; and j is 0 when $R^{23}$ has a substituent having an anionic moiety.

The cyanine dyes of the formula (II) are new.

Preferred embodiments of the cyanine dye of the formula (II) are as follows.

1) The cyanine dye having the above formula (II) wherein $A^2$ is an atom group for completing a benzene or naphthalene ring substituted with a halogen atom, a cyano group, a nitro group, a carboxyl group, a sulfonic acid group, an acyl group, an alkylsulfonyl group of 1-8 carbon atoms, an arylsulfonyl group of 1-8 carbon atoms, an alkoxycarbonyl group of 1-8 carbon atoms, a sulfamoyl group of 1-8 carbon atoms, an N-substituted sulfamoyl group of 1-8 carbon atoms, a carbamoyl group of 1-8 carbon atoms, an N-substituted carbamoyl group of 1-8 carbon atoms, an acylamino group of 1-8 carbon atoms, a ureido group of 1-8 carbon atoms, an amide group of 1-8 carbon atoms, an alkyl group of 1-8 carbon atoms, an aryl group of 6-8 carbon atoms, an alkoxy group of 1-8 carbon atoms, an aryloxy group of 6-8 carbon atoms, an alkylthio group of 1-8 carbon atoms, an arylthio group of 6-8 carbon atoms, a fluoroalkyl group of 1-8 carbon atoms, 5-membered or 6-membered heterocyclic ring, or a group containing a 5-membered or 6-membered heterocyclic ring, or an atom group for completing an unsubstituted naphthalene ring.

2) The cyanine dye having the above formula (II) wherein $L^2$ is a trivalent connecting group of 3 or 5 methines which may be substituted with a halogen atom, an alkyl group of 1-4 carbon atoms (the alkyl group may be bonded to other methine group to form a ring), a benzyl group or a phenyl group.

3) The cyanine dye having the above formula (II) wherein each of $R^{21}$ and $R^{22}$ is an unsubstituted alkyl group of 1-8 carbon atoms, an unsubstituted phenyl group, or a phenyl group substituted with an alkoxy group.

4) The cyanine dye having the above formula (II) wherein $R^{23}$ is an alkyl group of 1-18 carbon atoms which may be substituted with an alkoxy group of 1-4 carbon atoms, an alkylthio group of 1-4 carbon atoms, an alkoxycarbonyl group of 1-4 carbon atoms, a sulfonyl group, a halogen atom, or a hydroxyl group.

5) The cyanine dye having the above formula (II) wherein $X_b^{n-}$ is a halogen ion, a sulfonate ion, $ClO_4^-$, $BF_4^-$, $PF_6^-$, an acetic acid ion, a metal complex ion, or a phosphoric acid ion.

6) The cyanine dye having the above formula (II) wherein $A^2$ is an atom group for completing a benzene or naphthalene ring substituted with a halogen atom, a cyano group, a nitro group, a carboxyl group, a sulfonic acid group, an acyl group of 1-4 carbon atoms, an arylsulfonyl group of 6-8 carbon atoms, an alkoxycarbonyl group of 1-4 carbon atoms, a N-substituted sulfamoyl group of 1-4 carbon atoms, a ureido group of 1-4 carbon atoms, an amide group of 1-4 carbon atoms, an alkyl group of 1-4 carbon atoms, an aryl group of 6-8 carbon atoms, an alkoxy group of 1-4 carbon atoms an aryloxy group of 6-8 carbon atoms, an alkylthio group of 1-4 carbon atoms, an arylthio group of 6-8 carbon atoms, a fluoroalkyl group of 1-4 carbon atoms, a morphorinocarbonyl group, or a methylenedioxy group, or an atom group for completing an unsubstituted naphthalene ring.

7) The cyanine dye having the above formula (II) wherein $L^2$ is a trivalent connecting group of 3 or 5 methines which may be substituted with a halogen atom, an alkyl group of 1-4 carbon atoms which may be bonded to other methine group to form a ring, a benzyl group or a phenyl group.

8) The cyanine dye having the above formula (II) wherein each of $R^{21}$ and $R^{22}$ is an unsubstituted alkyl group of 1-3 carbon atoms, an unsubstituted phenyl group, or a phenyl group substituted with an alkoxy group of 1-3 carbon atoms.

9) The cyanine dye having the above formula (II) wherein $R^{23}$ is an alkyl group of 1-4 carbon atoms which may be substituted with an alkoxy group of 1-4 carbon atoms, an alkylthio group of 1-4 carbon atoms, an alkoxycarbonyl group of 1-4 carbon atoms, a sulfonyl group, a fluorine atom, or a hydroxy group.

10) The cyanine dye having the above formula (II) wherein $X_b^{n-}$ is a halogen ion, $ClO_4^-$, $BF_4^-$, $PF_6^-$, an acetate ion, a p-toluenesulfonate ion or $CF_3SO_3^-$.

The optical disc having a recording layer made of a specific cyanine dye represented by the above formula (I), particularly the specific cyanine dye including the cyanine dye having the above formula (II), shows excellent recording and reproducing characteristics and high reflectance. Especially in the case of providing a recording layer made of the novel cyanine dye having the formula (II) on the substrate, a prominently high reflectance can be obtained.

Moreover, in the case of providing a recording layer made of the cyanine dye of the invention on the substrate and further laminating a reflecting layer on the recording layer, a reflectance can be improved with little lowering in recording and reproducing characteristics such as recording sensitivity, C/N and modulation degree.

In particular, when a recording layer made of a mixture of the specific cyanine dye of the invention and other dye having absorption maximum on the longer wavelength side than the absorption maximum of the cyanine dye is provided on the substrate and a reflecting layer made of a metal is further provided on the recording layer, recording and reproducing characteristics such as recording sensitivity, C/N and modulation degree are enhanced in addition to the improvement of reflectance.

Furthermore, the optical disc of the invention shows a prominently high reflectance, so that CD format signals recorded on the optical disc can be reproduced using commercially available CD players, and hence the optical disc of the invention is very useful as CD-DRAW.

The novel cyanine dye having the above formula (II) has a substituent (including unsubstituted naphthyl group) in an aromatic ring of a benzimidazole ring which is positioned at each end of the polymethine chain. Therefore, there can be selected a cyanine dye having desired characteristics such as solubility and absorption spectrum from the various cyanine dyes (of the formula (II)). Hence, the cyanine dye of the present invention can be utilized for markedly wide applications such as optical filters, dyes and pharmaceuticals as well as the above information recording media.

DETAILED DESCRIPTION OF THE INVENTION

The information recording medium of the present invention basically comprises a substrate and a recording layer provided thereon which contains a cyanine dye having the aforementioned formula (I).

One embodiment of the information recording medium of the invention has a basic structure wherein a reflecting layer is further provided on the above-mentioned dye recording layer.

The present inventors have earnestly studied for providing novel dyes capable of forming a recording layer on the substrate by means of a coating method and showing both of high reflectance and excellent recording and reproducing characteristics such as high C/N when used for optical discs.

As a result, they have found that the above-mentioned excellent characteristics can be obtained by using a cyanine dye having the aforementioned formula (I) for the recording layer. Further, they have also found that the reflectance can be improved with little reduction of the recording and reproducing characteristics such as recording sensitivity, C/N and modulation degree by superposing a reflecting layer made of a metal on the recording layer made of the above-mentioned specific cyanine dye. Especially in the case of providing a recording layer made of a novel cyanine dye having the formula (II) of the specific structure among the compounds having the formula (I), a prominently enhanced reflectance can be obtained.

Moreover, the recording and reproducing characteristics such as recording sensitivity, C/N and modulation degree can be easily enhanced in addition to the high reflectance by providing a recording layer made of a mixture of a cyanine dye having the formula (I) and other dye whose absorption maximum is positioned on the longer wavelength side than the absorption maximum of the cyanine dye.

That is, in the cyanine dye having the formula (I) of the invention, the absorption maximum can be varied in its position to locate on either the shorter wavelength side or the longer wavelength side by changing the structure thereof. Most of the above-mentioned cyanine dyes have such properties that they show high reflectance and relatively high C/N and modulation degree within the wavelength region of approx. 780 nm, that is a wavelength of ordinary laser beam. By using a dye of the invention having absorption maximum within the wavelength region shorter than 780 nm among the above-mentioned compounds of the invention and a dye showing high sensitivity within the wavelength region of the laser beam (i.e., other dye whose absorption maximum is positioned on the longer wavelength side the cyanine dye) in combination, recording and reproducing characteristics such as recording sensitivity, C/N and modulation degree is enhanced in addition to the high reflectance.

The information recording medium of the invention can be prepared, for example, by the following process.

A material of the substrate employable in the invention can be selected from any materials which have been employed for substrates of the conventional information recording media. Examples of the substrate materials employable in the invention include glasses, acrylic resins (e.g., polymethyl methacrylate), vinyl chloride resins (e.g., polyvinyl chloride and vinyl chloride copolymer), epoxy resins, amorphous polyolefins and polyesters. These materials may be employed in combination, if desired. Further, these materials can be employed in the form of a film, or can be employed as a rigid substrate. Of these materials, preferred is polycarbonate from the viewpoints of moisture resistance, dimensional stability, manufacturing cost, etc.

On the surface of the substrate where the recording layer is to be provided, an undercoat layer may be provided to improve surface smoothness of the substrate, to enhance the adhesion between the substrate and the recording layer and to prevent denaturing of the recording layer. Examples of materials for the undercoat layer include polymer materials such as polymethyl methacrylate, acrylic acid methacrylic acid copolymer, styrene/maleic anhydride copolymer, polyvinyl alcohol, N-methylol acrylamide, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; and organic materials such as silane coupling agent.

The undercoat layer can be formed on the substrate, for example, by dissolving or dispersing the above-mentioned material in an appropriate solvent to prepare a coating solution or dispersion, applying the coating solution or dispersion to the surface of the substrate using known coating methods such as spin coating, dip coating and extrusion coating. The thickness of the undercoat layer is generally in the range of 0.005 to 20 $\mu$m, preferably in the range of 0.01 to 10 $\mu$m.

On the substrate (or undercoat layer), tracking grooves or protruded and depressed portions (pits) indicating address signals are preferably formed. In the case of using a resin material (e.g., polycarbonate) as the substrate material, it is preferred to directly form the grooves on the substrate by subjecting the resin material to injection molding, extrusion molding or the like.

Formation of the grooves can be also made by providing a pre-groove layer on the substrate. As a material of the pre-groove layer, there can be employed a mixture of at least one monomer (or oligomer) selected from the group consisting of monoester, diester, triester and tetraester of an acrylic acid and a photopolymerization initiator.

The pre-groove layer can be formed on the substrate by the process described below. In the first place, a mixture liquid of an acrylic acid ester and a photopolymerization initiator is coated on a precisely prepared stamper, and on the coated layer of the liquid is placed a substrate. Then, the coated layer is cured under irradiation with ultraviolet rays via the stamper or the substrate so as to fix the substrate to the coated layer. Thereafter, the substrate is separated from the stamper. Thus, a substrate provided with a pre-groove layer can be prepared.

The thickness of the pre-groove layer is generally in the range of 0.05 to 100 $\mu$m, preferably in the range of 0.1 to 50 $\mu$m.

On the substrate, a recording layer is provided.

The recording layer of the information recording medium according to the invention is characterized in that the layer contains a cyanine dye having the following formula (I):

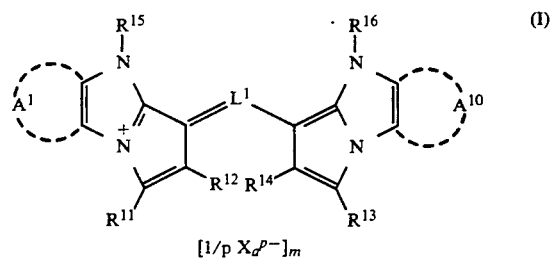

$$[1/p \; X_d^{p-}]_m$$

wherein each of $A^1$ and $A^{10}$ is an atom group for completing an aromatic ring which may have one or more substituents; $L^1$ is a methine group which may have one or more substituents or a trivalent connecting group of conjugated 3, 5 or 7 methines which may have one or more substituents; each of $R^{11}$, $R^{12}$, $R^{13}$ and $R^{14}$ is a hydrogen atom, or an alkyl, phenyl, acyl, alkoxy or 5- or 6-membered heterocyclic group which may have one or more substituents; each of $R^{15}$ and $R^{16}$ is an alkyl group which may have one or more substituents and one of said substituents may have an anionic moiety; $X_d^{p-}$ is an anion; p is 1, 2 or 3; m is 1 or 0; and m is 0 when $R^{15}$ or $R^{16}$ has a substituent having an anionic moiety.

The atom group indicated by $A^1$ or $A^{10}$ for completing an aromatic ring preferably is a benzene ring which is substituted or a naphthalene ring which may be substituted. Examples of substituents on the benzene ring or naphthalene ring indicated by $A^1$ or $A^{10}$ include a halogen atom (e.g., F or Cl), a cyano group, a nitro group, a carboxyl group, a sulfonic acid group, an acyl group (e.g., acetyl or benzoyl), an alkylsulfonyl group (e.g., methanesulfonyl or butanesulfonyl), an arylsulfonyl group (e.g., phenylsulfonyl and 3-chlorophenylsulfonyl), an alkoxycarbonyl group (e.g., ethoxycarbonyl or 2-ethoxycarbonyl), a sulfamoyl group or an N-substituted sulfamoyl group (e.g., butylsulfamoyl, phenylsulfamoyl or dibutylsulfamoyl), a carbamoyl group or an N-substituted carbamoyl group (e.g., ethylcarbamoyl or phenylcarbamoyl), an acylamino group (e.g., acetylamino or benzoylamino), a ureido group (e.g., methyl ureido, ethyl ureido or phenyl ureido), an amide group (e.g., methylamide), an alkyl group (e.g., methyl, ethyl or isobutyl), an aryl group (e.g., benzyl), an alkoxy group (e.g., methoxy, butoxy or 2-methoxyethoxy), an aryloxy group (e.g., phenoxy or 4-chlorophenoxy), an alkylthio group (e.g., methylthio, butylthio or benzylthio), an arylthio group (e.g., phenylthio or 4-butylphenylthio), a 5-membered or 6-membered heterocyclic ring, and a group containing a heterocyclic ring (e.g., morpholinocarbonyl). In these substituents, each group preferably has 1-8 carbon atoms.

Particularly preferred is a substituent of which Hammet σ constant is positive or conversion value of Hammet σ constant is positive. Most preferred are a halogen atom (e.g., F or Cl), a halogenated alkyl group of 1-4 carbon atoms (e.g., trifluoromethyl), a cyano group and an alkoxycarbonyl group of 1-4 carbon atoms (e.g., ethoxycarbonyl).

A preferred example of the connecting group indicated by $L^1$ is a connecting group of 3 or 5 methines which may have one or more substituents. Preferred substituents are a halogen atom such as F and Cl, an alkyl group of 1-8 carbon atoms, an alkoxy group of 1-6 carbon atoms, an aralkyl group and an aryl group of 6-8 carbon atoms. Particularly preferred are a halogen atom, an alkyl group of 1-4 carbon atoms, a benzyl group and a phenyl group. Most preferred are methyl, benzyl and a halogen atom such as Cl.

As the group indicated by $R^{11}$, $R^{12}$, $R^{13}$ or $R^{14}$, there can be mentioned an alkyl group of 1-18 (preferably 1-4) carbon atoms which may be substituted (e.g., methyl, ethyl, butyl, isobutyl, 2-ethylhexyl, dodecyl, trifluoromethyl, 2-ethoxyethyl, 2-hydroxyethyl, 3-sulfopropyl, 3-sulfobutyl or 2-sulfoethyl), and a phenyl or naphthyl group of 6-18 (preferably 6-10) carbon atoms which may be substituted (e.g., phenyl, 4-methylphenyl, 3,5-dichlorophenyl, 4-carboxyphenyl, 4-methoxyphenyl, β-naphthyl or 2,5-di-tert-amylphenyl). Further, as the group of $R^{11}$, $R^{12}$, $R^{13}$ or $R^{14}$, there can be mentioned an acyl group such as acetyl and benzoyl, an alkoxy group such as methoxy and phenoxy, and a 5- or 6-membered heterocyclic group such as 2-pyridyl and 4-pyridyl.

Particularly, preferred are an unsubstituted alkyl group of 1-8 carbon atoms, an unsubstituted or alkoxysubstituted phenyl group and an unsubstituted naphthyl group, and most preferred are methyl, ethyl, n-propyl and phenyl.

As the group indicated by $R^{15}$ or $R^{16}$, there is preferably mentioned an alkyl group of 1-18 (preferably 1-5) carbon atoms which may be substituted, for example, an unsubstituted alkyl group (e.g., methyl, ethyl, isopropyl, sec-butyl, cyclohexyl or 2-ethylhexyl); an alkyl group substituted with a non-acidic group such as an alkoxy group of 1-4 carbon atoms, an alkylthio group of 1-4 carbon atoms, an alkoxycarbonyl group of 1-4 carbon atoms, a halogen atom or a hydroxyl group (e.g., 2-ethoxyethyl, 2-methylthiopropyl, benzyl, 3-phenylpropyl, dodecyl or 3-acetoxypropyl); and an alkyl group of 1-4 carbon atoms which is substituted with a sulfo or carboxyl group (e.g., 3-sulfopropyl, 3-sulfobutyl, 4-sulfobutyl, 2-sulfoethyl or 3-caboxypropyl). When $R^{15}$ or $R^{16}$ is a substituent having an anionic moiety, the substituent forms an inner salt. Further, when $R^{15}$ and $R^{16}$ are substituents having an anionic moiety, it is possible that one is a salt with a metal or the like and the other forms an inner salt.

There is more preferably mentioned methyl, ethyl, isopropyl, sec-butyl, cyclohexyl, 2-ethylhexyl, benzyl, 2-phenylethyl, dodecyl, 2-ethoxyethyl, 3-ethoxypropyl, hydroxyethyl, 3-acetoxypropyl, ethoxycarbonylmethyl, 3-sulfopropyl, 2,3-tetrafluoropropyl, allyl, 2-methylthioethyl and 3-methoxypropyl. Most preferred are methyl, ethyl, sec-butyl, 2-ethoxyethyl, 3-ethoxypropyl, 3-methoxypropyl, hydroxyethyl, 3-acetoxypropyl, ethoxycarbonylmethyl, 3-sulfopropyl and 2,3-tetrafluoropyrpyl.

Preferred examples of the anion indicated by $R_d^{p-}$ are a halide ion (e.g., $Cl^-$, $Br^-$ and $I^-$), a sulfonate ion (e.g., $CH_3SO_3^-$, $CF_3SO_3^-$, $CH_3OSO_3^-$,

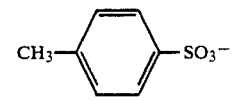

a naphthalene-1,5-disulfonate ion), $ClO_4^-$, $BF_4^-$, a metal complex ion (e.g.,

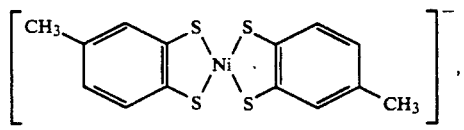

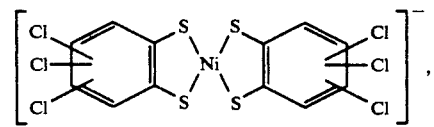

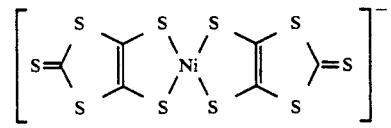

and a phosphoric acid ion (e.g., $PF_6^-$, $H_2PO_4^-$, t-$C_4H_9$

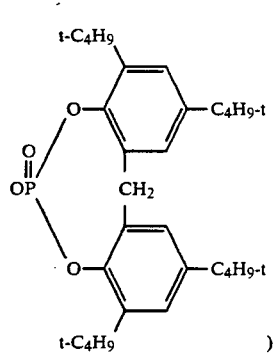

Particularly preferred are $ClO_4^-$, $PF_6^-$ and

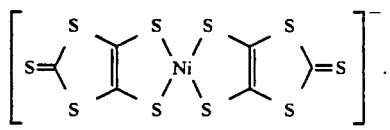

In these anions, $I^-$ used in the intermediate stage of the synthesis or

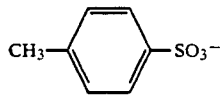

may be contained in an extremely small amount.

P preferably is 1 or 2.

In the compound having the formula (I) employable for the information recording medium of the invention, $R^{11}$ and $R^{13}$, $R^{12}$ and $R^{14}$, $R^{15}$ and $R^{16}$, and $A^1$ and $A^{10}$ are each preferably the same as each other, $A^1$ and $A^{10}$ are benzene rings which has a substituent or naphthalene rings which may have one or more substituents, and $R^{11}$, $R^{13}$, $R^{12}$ and $R^{14}$ are hydrogen atoms, alkyl groups which may have one or more substituents or phenyl groups which may have one or more substituents. That is, the preferred formula is the following formula (II):

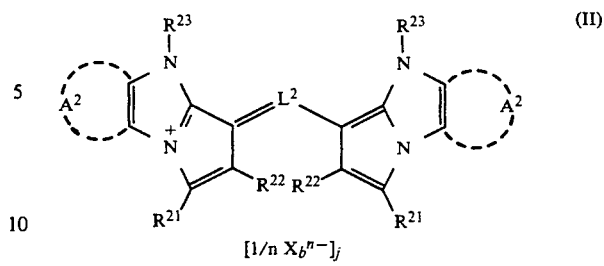

wherein $A^2$ is an atom group for completing a benzene ring which has one or more substituents or a naphthalene ring which may have one or more substituents; $L^2$ is a methine group which may have one or more substituents or a trivalent connecting group of conjugated 3, 5 or 7 methines which may have one or more substituents; each of $R^{21}$ and $R^{22}$ is a hydrogen atom, an alkyl group which may have one or more substituents or a phenyl group which may have one or more substituents; $R^{23}$ is an alkyl group which may have one or more substituents and one of said substituents may have an anionic moiety; $X_b^{n-}$ is an anion; n is 1, 2 or 3; j is 1 or 0; and j is 0 when $R^{23}$ has a substituent having an anionic moiety.

Examples of substituents on the benzene ring or naphthalene ring indicated by $A^2$ are those described for $A^1$ and $A^{10}$ in the aforementioned formula (I).

The connecting group indicated by $L^2$ is preferably a connecting group of 2, 3 or 5 methines which may have one or more substituents. Preferred examples of the substituents are those described for $L^1$ in the aforementioned formula (I).

Preferred examples of the group indicated by $R^{21}$ and $R^{22}$ are those described as examples of the alkyl, phenyl or naphthyl group indicated by $R^{11}$, $R^{12}$, $R^{13}$ or $R^{14}$ in the aforementioned formula (I).

As examples of the group indicated by $R^{23}$, there can be mentioned those described as examples of the group indicated by $R^{15}$ or $R^{16}$ in the aforementioned formula (I).

As preferred examples of the anion indicated by $X_b^{n-}$, there can be mentioned those described as examples of the anion indicated by $X_d^{p-}$ in the aforementioned formula (I).

n is preferably 1 or 2.

Concrete examples of the compounds having the above formula (I) are described below (I-1 to I-47). The compounds of I-1 to I-43 are included in the cyanine dyes of the formula (II).

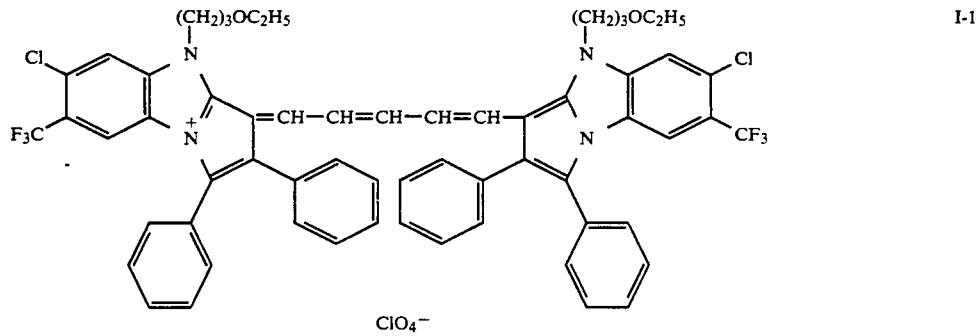

I-1

-continued
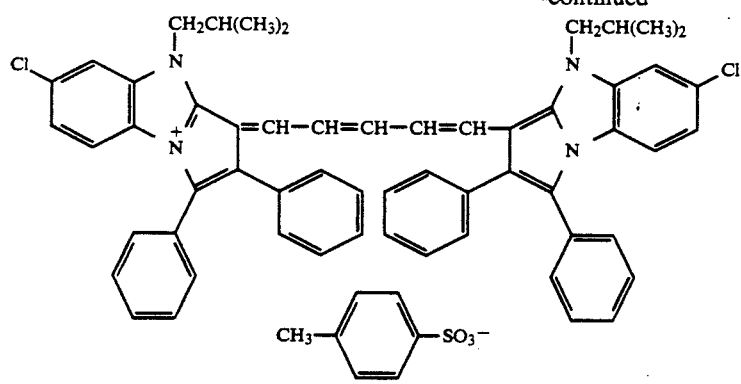
I-2
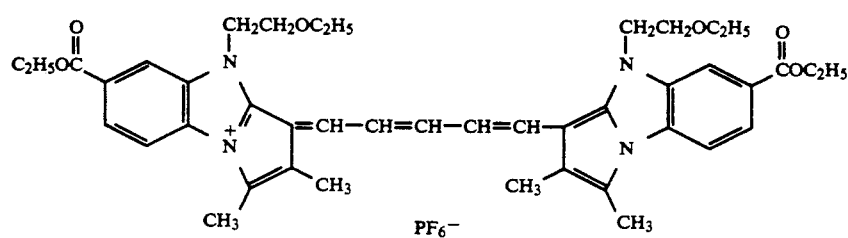
I-3
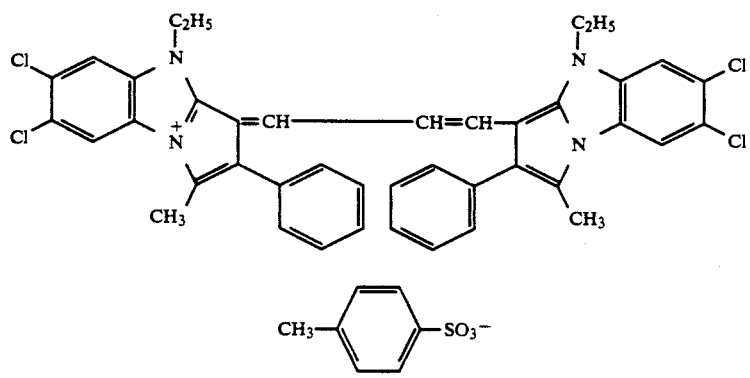
I-4
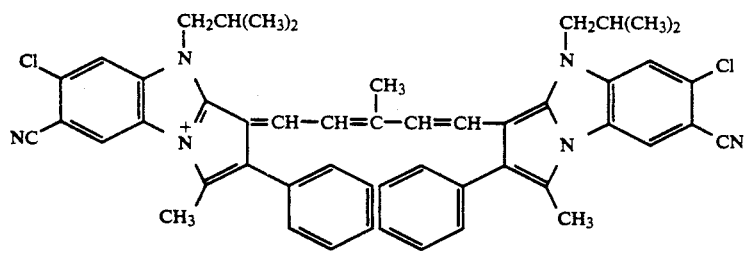
I-5
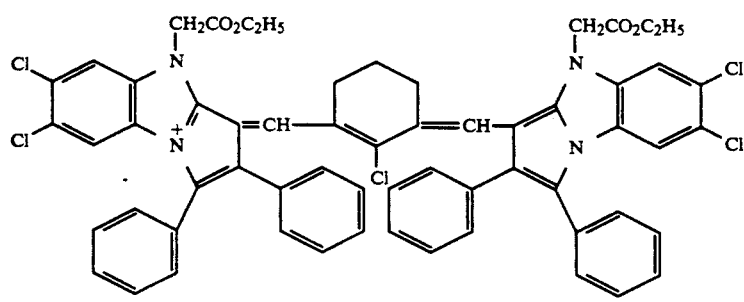
I-6

-continued
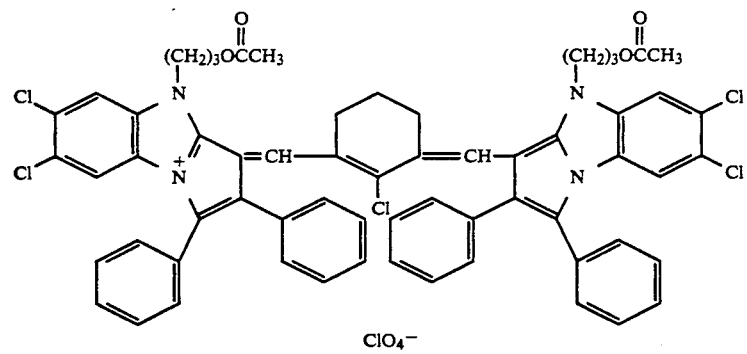
I-7
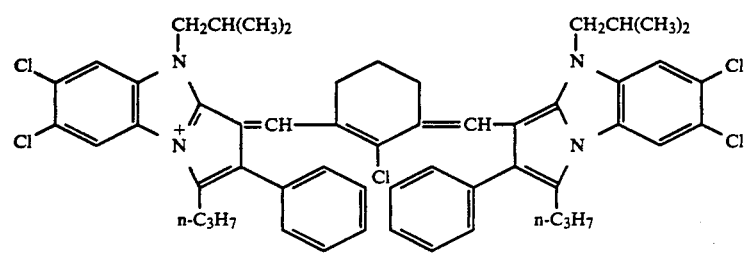
I-8
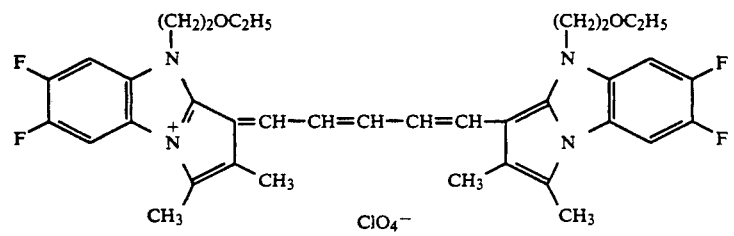
I-9
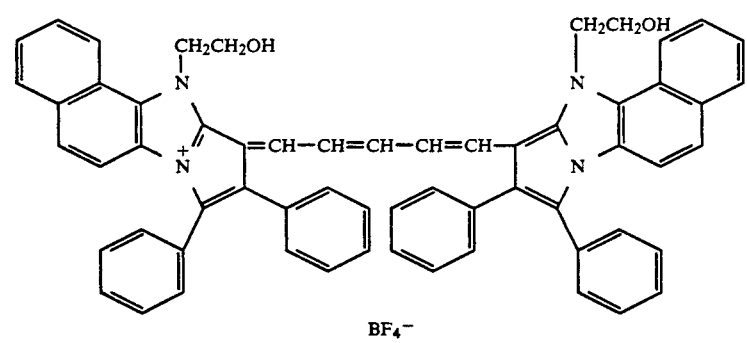
I-10
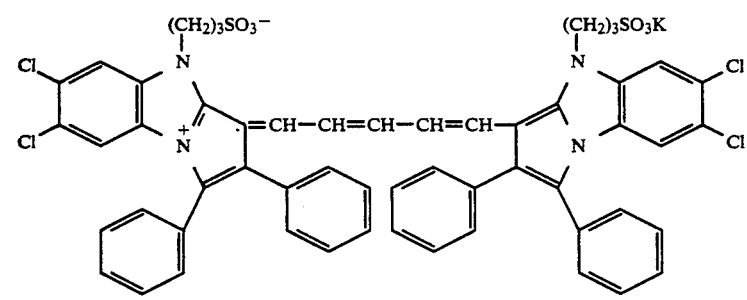
I-11

-continued
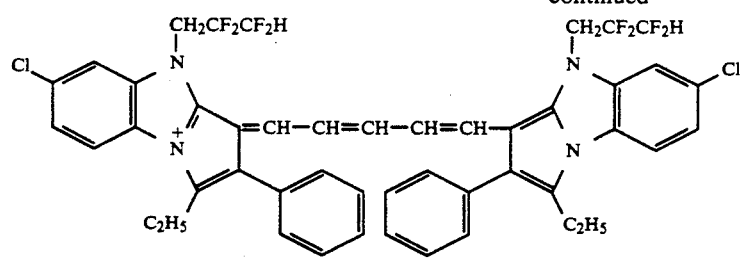
I-12
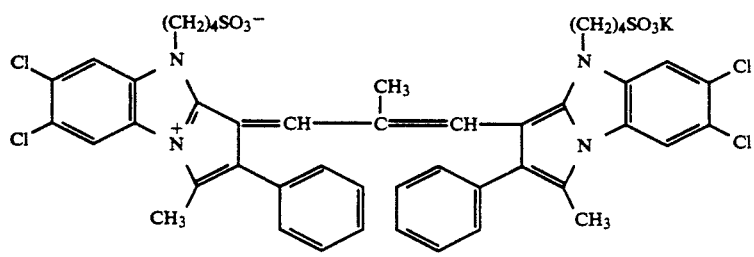
I-13
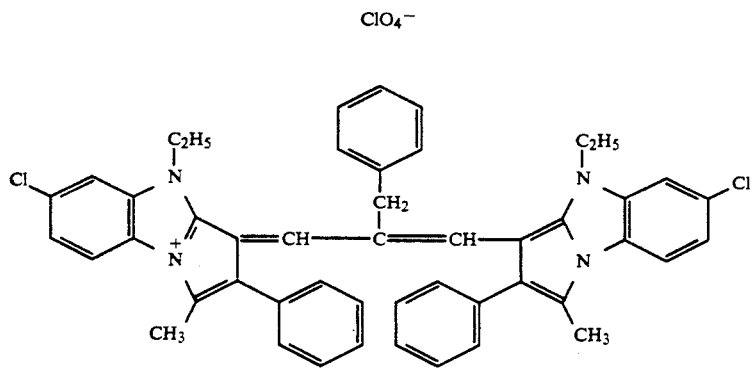
I-14
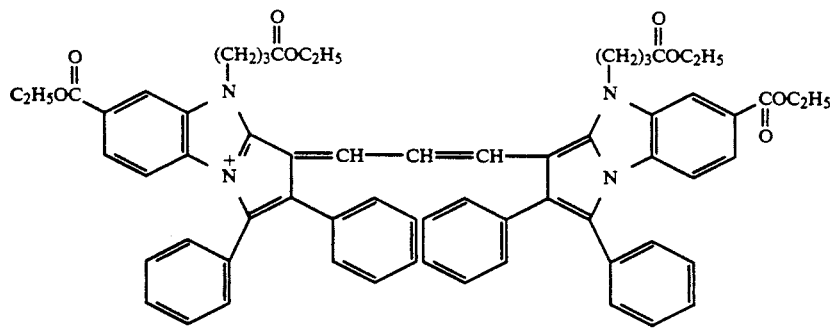
I-15
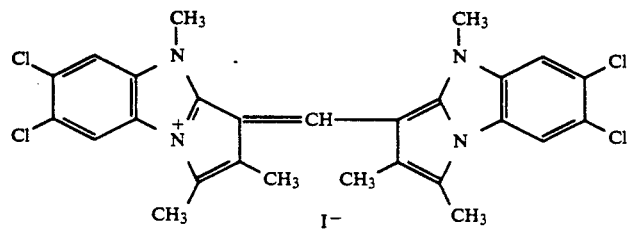
I-16

-continued
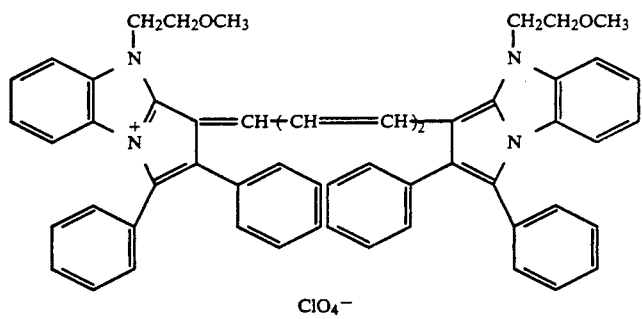
I-17
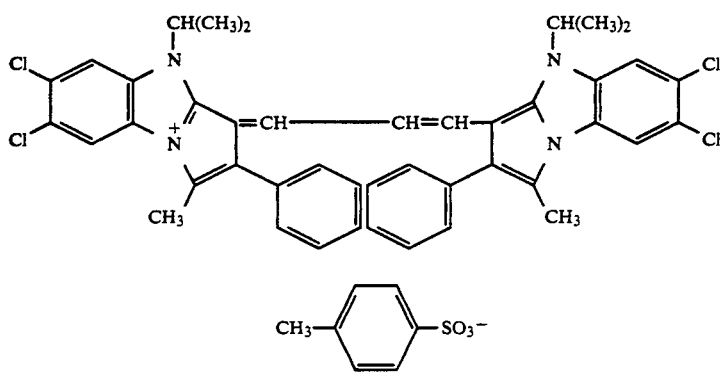
I-18
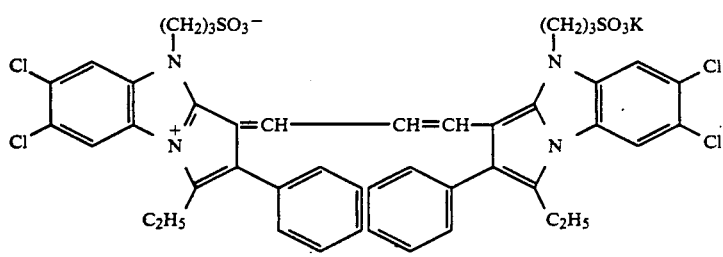
I-19
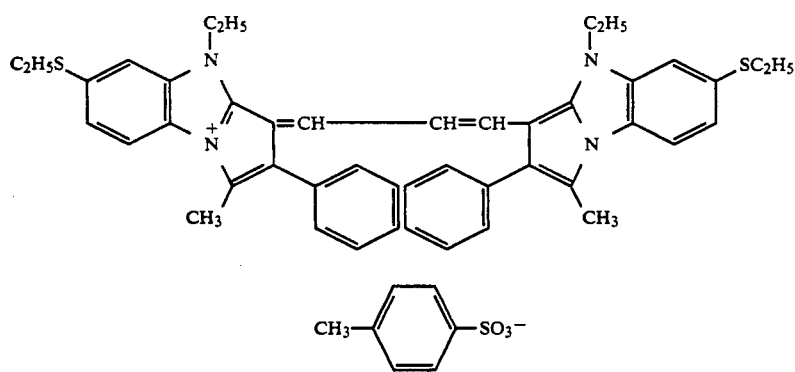
I-20
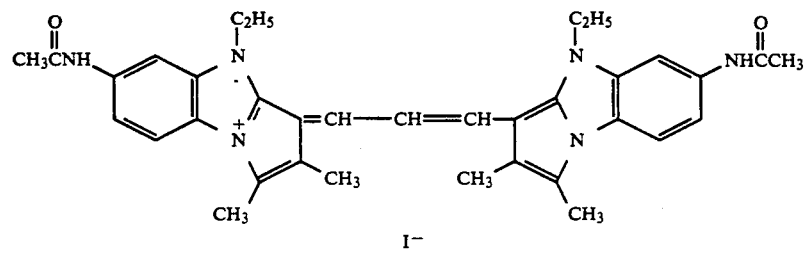
I-21

-continued
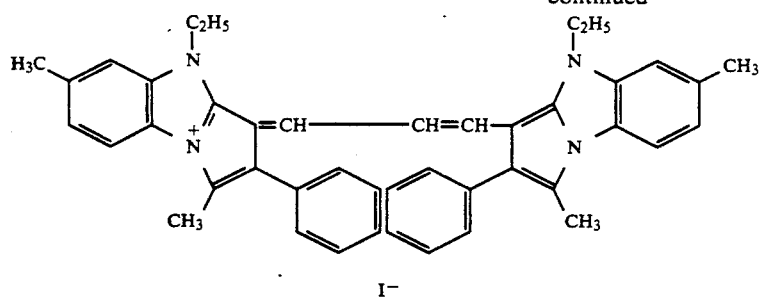
I-22
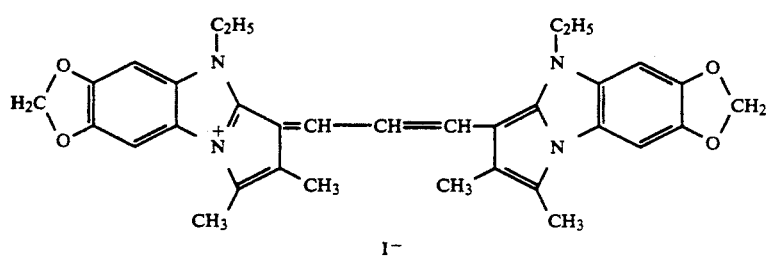
I-23
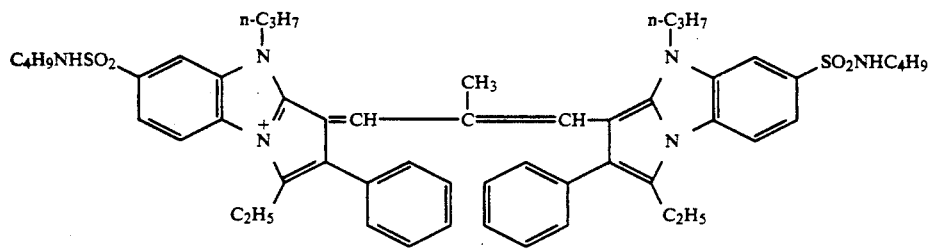
I-24
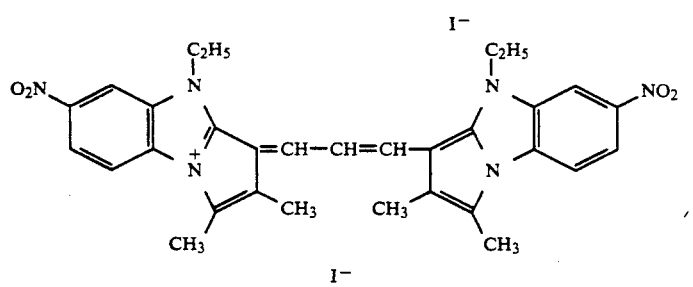
I-25
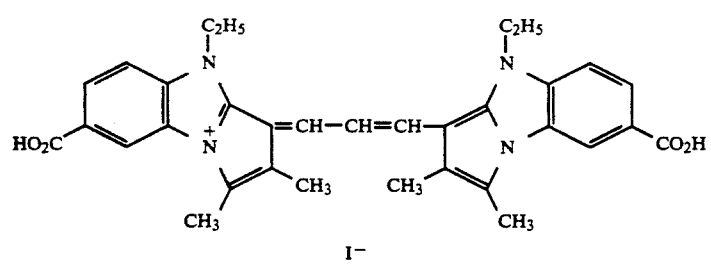
I-26
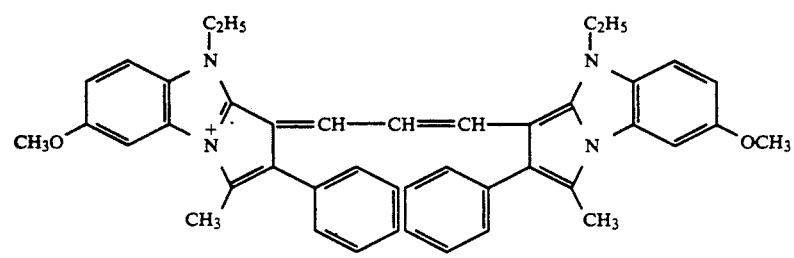
I-27

-continued
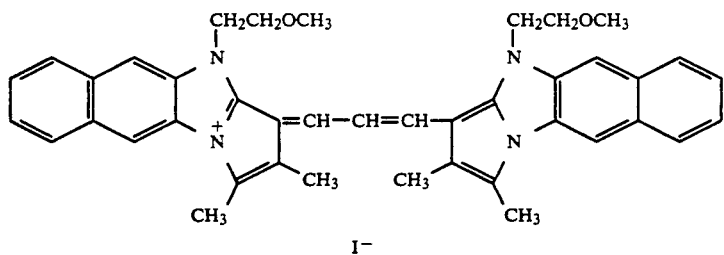
I-28
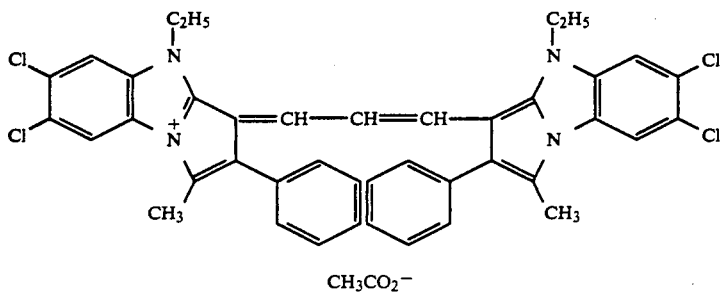
I-29
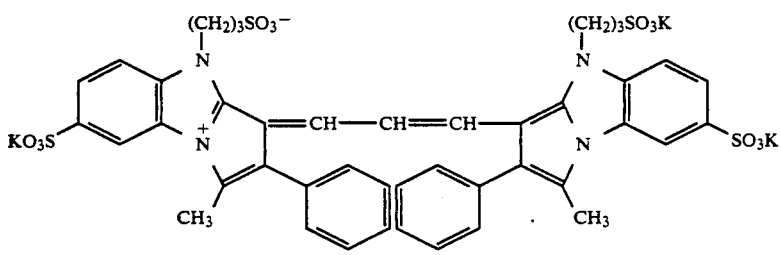
I-30
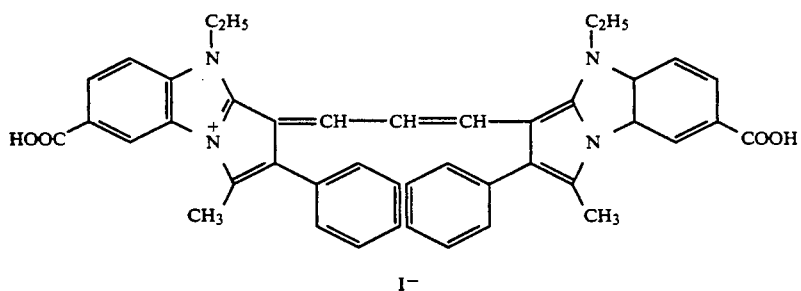
I-31
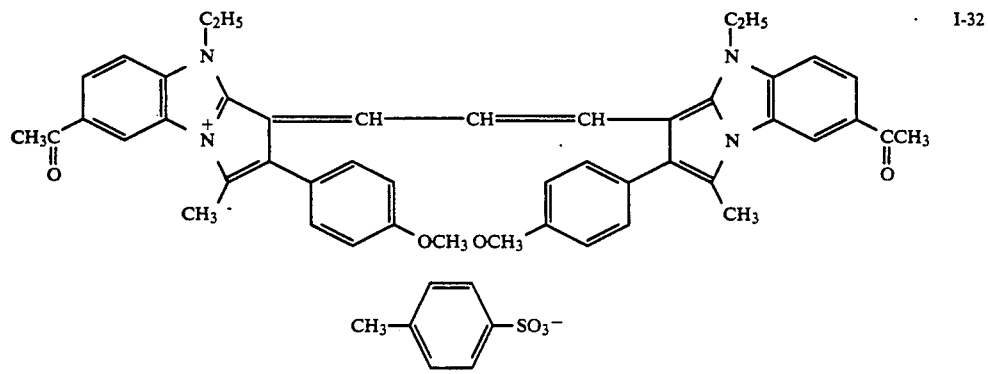
I-32

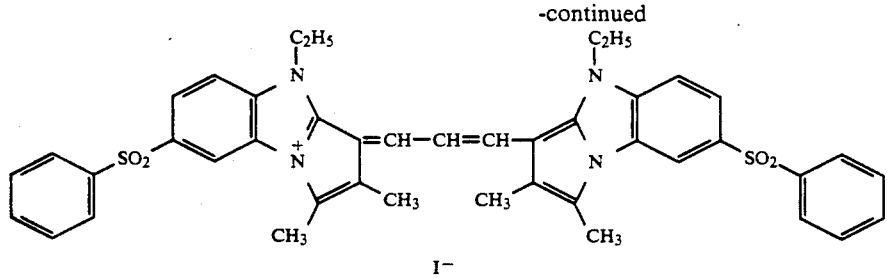
I-34
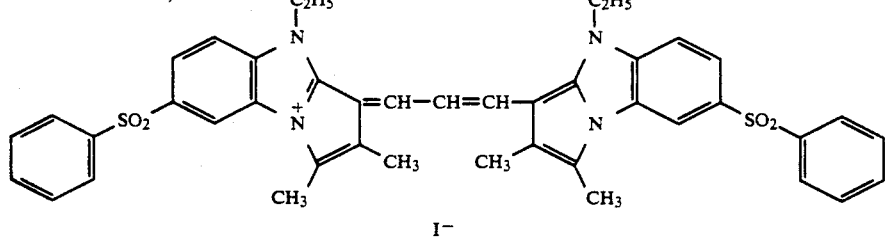
I-35
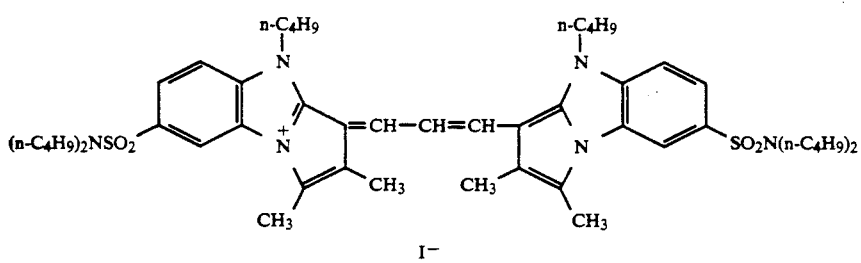
I-36
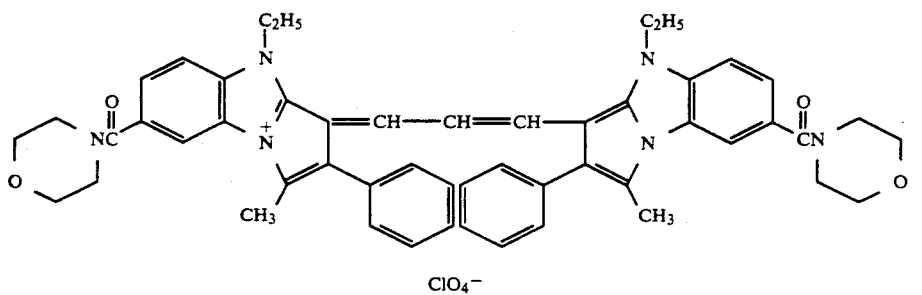
I-37
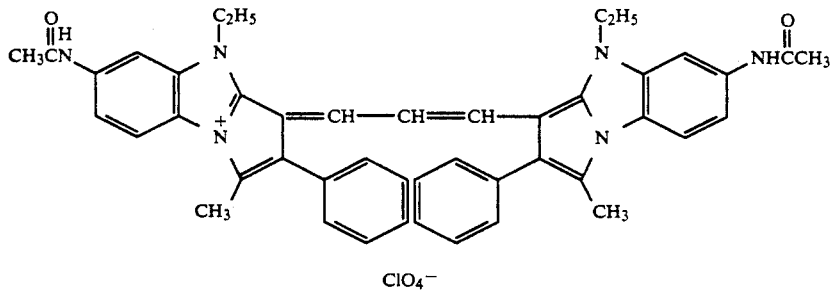
I-38
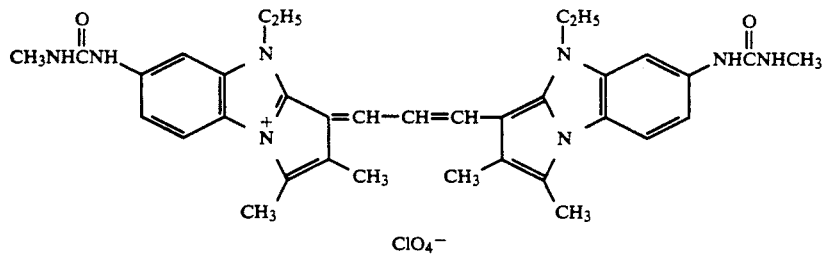
I-39
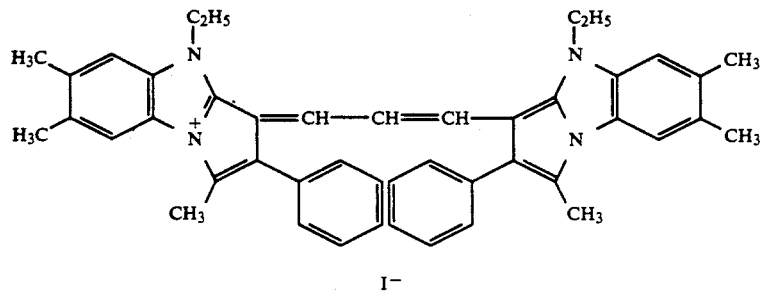

-continued
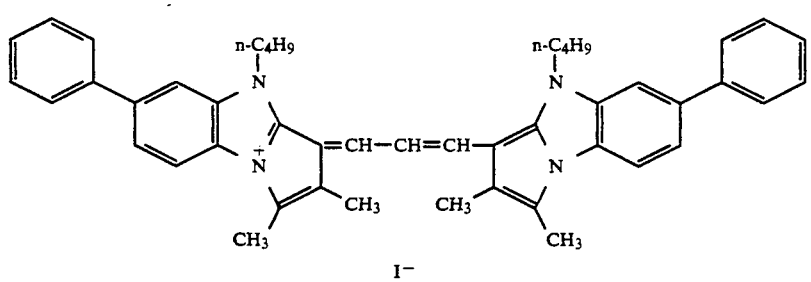
I-40
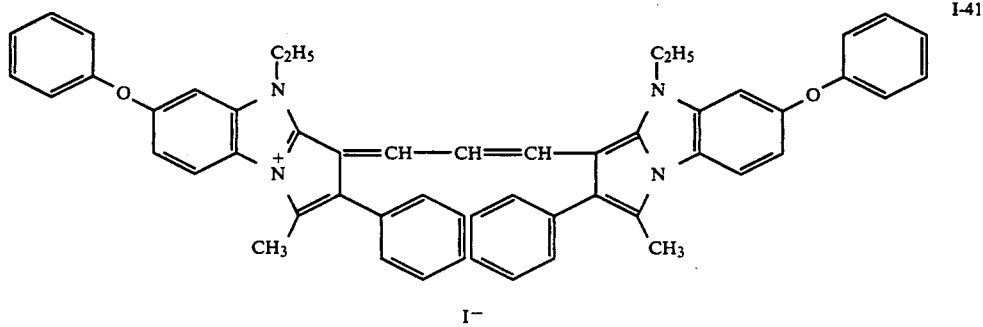
I-41
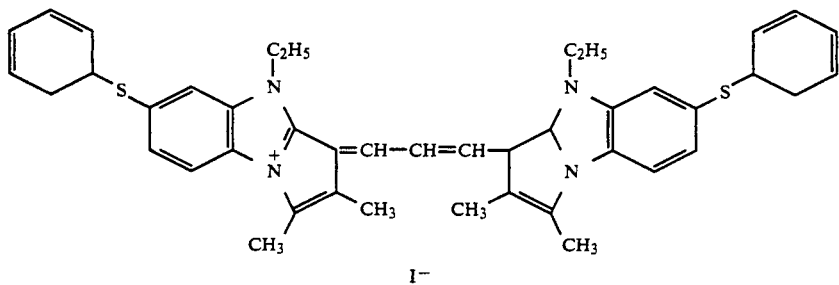
I-42
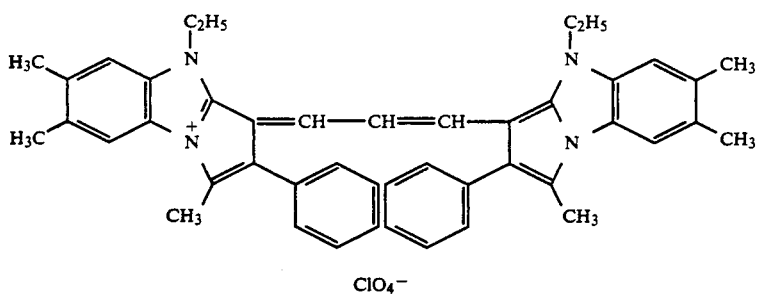
I-43
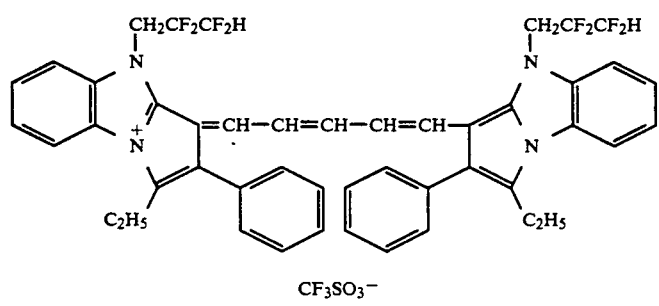
I-44

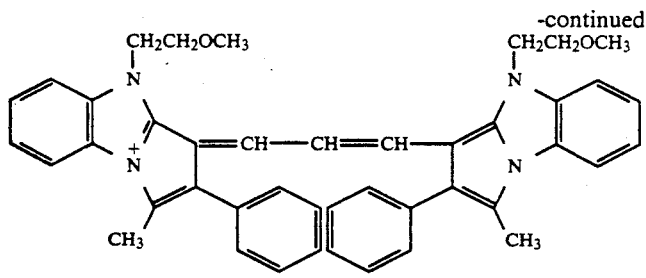

I-45

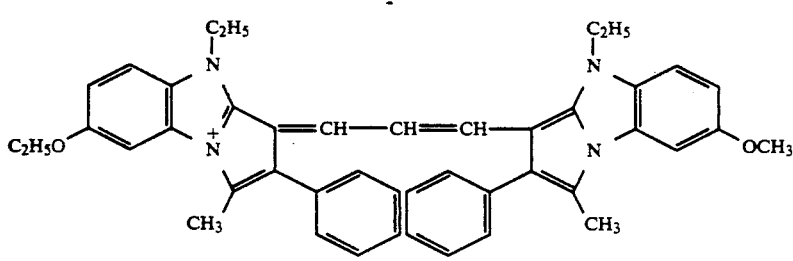

I-46

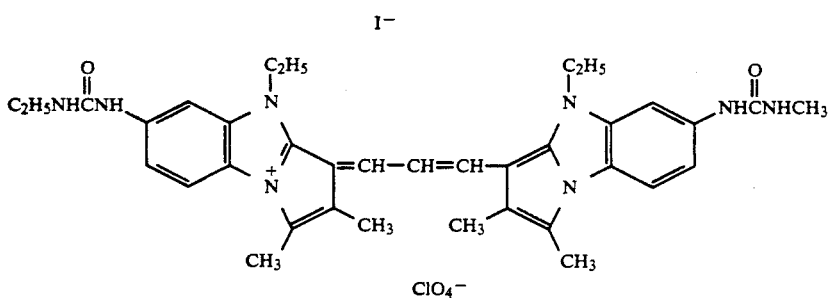

I-47

The cyanine dyes (polymethine compounds) of the formula (I) having no substituent on the benzene ring of the benzimidazole ring are described in a report "Khim. Geterotsikl. Soedin.", 1967, No. 5, pp. 917–922, (in Russian), written by Babichev and Babicheva. See "Chemical Abstracts", Vol. 69, p. 5,626, Sec. 60031V. Examples of the synthesis processes are hereinafter described in Examples 1-2.

As described hereinbefore, in the case that the above-mentioned dye and other dye showing high sensitivity at the wavelength of a laser beam (i.e., dye having absorption maximum on the longer wavelength side than the absorption maximum of the above-mentioned dye) are used in combination, there can be obtained an information recording medium improved in the recording and reproducing characteristics such as recording sensitivity, C/N and modulation degree in addition to the high reflectance. Employment of such combination of dyes as a dye component of the recording layer is very effective especially in the case of providing a reflecting layer of a metal such as Au on the recording layer.

In the optical disc having a reflecting layer on the recording layer, when the cyanine dye having the above formula (I) is used in combination with other dye having absorption maximum on the longer wavelength side than the absorption maximum of the cyanine dye, the absorption maximum of the dye used in combination with the cyanine dye preferably is higher than the absorption maximum of the cyanine dye by not less than 20 nm from the viewpoint of enhancement of C/N and reflectance.

As the dyes used in combination with the cyanine dye, any dyes can be employed, provided that they satisfy the above-mentioned conditions. However, in order to form a uniform dye recording layer, preferably employed are those having high compatibility with the dye of the aforementioned formula (I) and being soluble in the same organic solvent as that for the dye of the formula (I). By forming a uniform dye recording layer, the resulting information recording medium comes to exhibit excellent recording and reproducing characteristics such as high C/N and high modulation degree. Preferred examples of such dyes are polymethine dyes such as cyanine dye, oxonol dye, pyrylium dye and thiopyrylium dye.

Particularly in the case of an optical disc having a reflecting layer on the recording layer and when the recording layer is formed using a mixture of a specific cyanine dye having benzoindolenine structure represented by the following formula (III) that has a relatively high reflectance and also is excellent in the recording and reproducing characteristics such as C/N and recording sensitivity and a dye of the formula (I) of the invention, the above-mentioned recording and reproducing characteristics and the reflectance can be prominently enhanced.

Accordingly, as the dyes having absorption maximum on the longer wavelength side, preferred are cyanine dyes having benzoindolenine structure which are represented by the following formula (III):

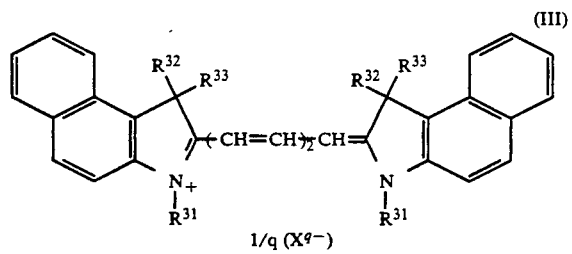

1/q (X^q−)

wherein each of $R^{31}$, $R^{32}$ and $R^{33}$ is an alkyl group of 1-8 carbon atoms which may have one or more substituents; $X^{q-}$ is an anion; and q is 1 or 2.

As the alkyl group of 1-8 carbon atoms which may have one or more substituents, that is indicated by $R^{31}$ in the formula (III), there can be mentioned methyl, ethyl, n-propyl, n-butyl, isobutyl and 2-ethylhexyl. Preferred is an alkyl group of 1-6 carbon atoms (e.g., methyl, ethyl, n-propyl, n-butyl or isobutyl). Examples of the substituents of the alkyl group are a fluorine atom and an alkoxy group. Particularly preferred is an unsubstituted alkyl group.

As the alkyl group indicated by $R^{32}$ or $R^{33}$, preferred is an unsubstituted alkyl group having 1-8 carbon atoms (e.g., methyl, ethyl or propyl), and particularly preferred are methyl and ethyl.

$X^{q-}$ is the same anion as indicated by $X^{p-}$ in the aforementioned formula (I).

Examples of the compounds having the formula (III) include the following compounds III-1 to III-16:

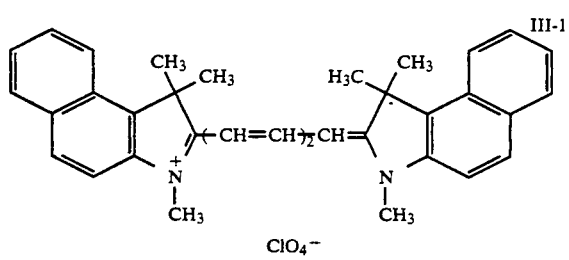

ClO₄⁻

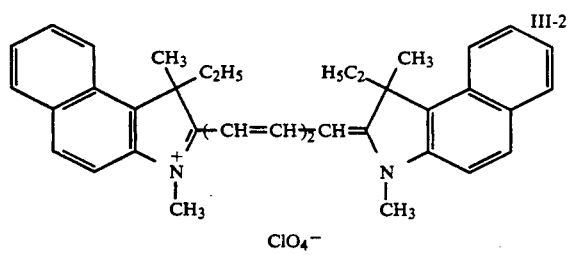

ClO₄⁻

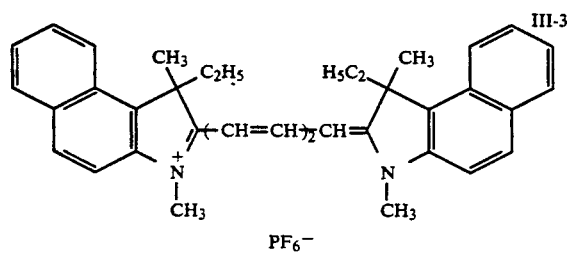

PF₆⁻

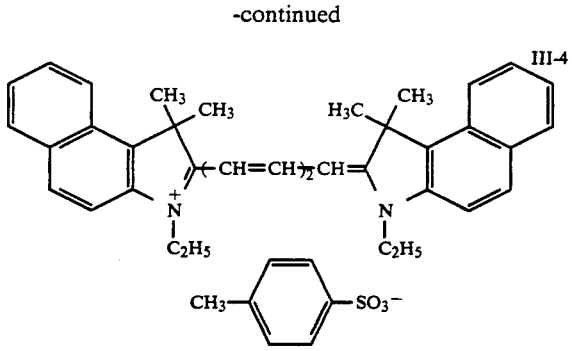

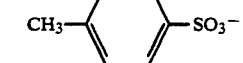

CH₃—⟨benzene⟩—SO₃⁻

CF₃SO₃⁻

ClO₄⁻

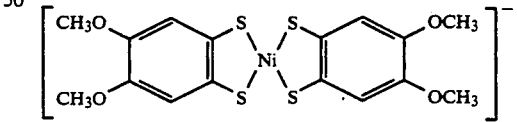

ClO₄⁻

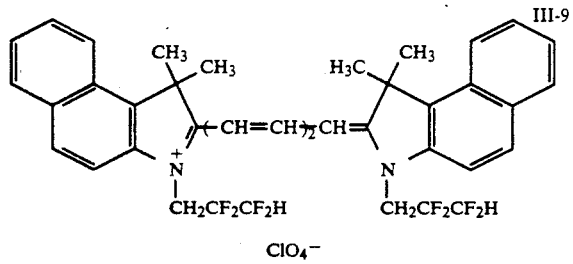

III-9

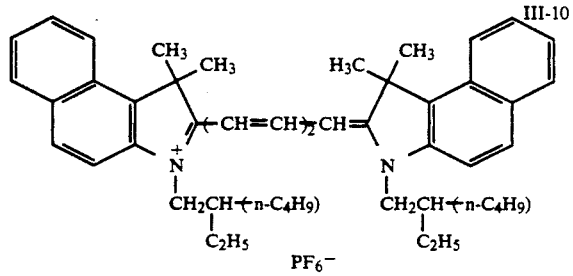

III-10

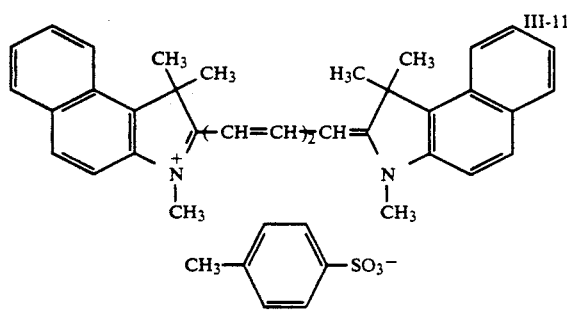

III-11

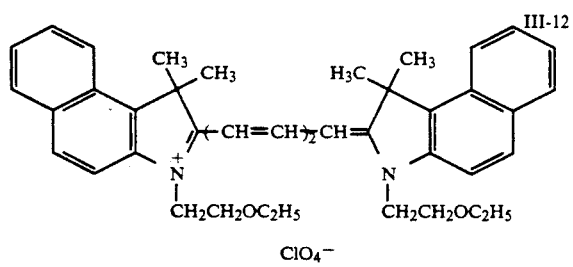

III-12

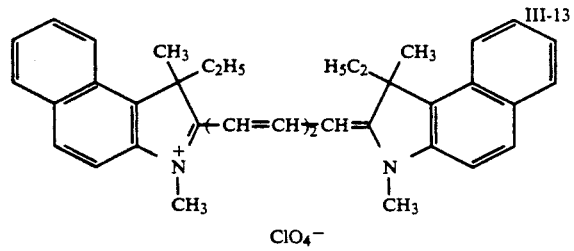

III-13

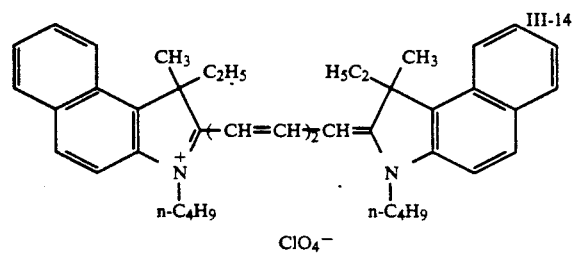

III-14

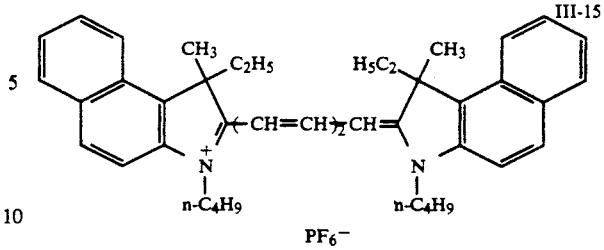

III-15

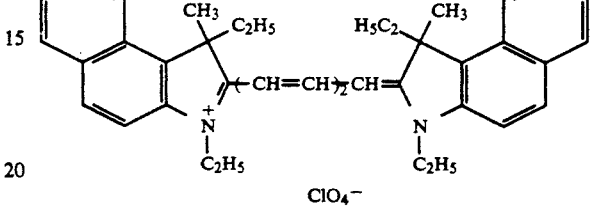

III-16

The cyanine dyes having the indolenine structure (represented by the above formula (III)) which are exemplified as above are described in the aforementioned Japanese Patent Provisional Publications No. 64(1989)-40382 and No. (1989)-40387.

In a combination of the dye having the formula (I) and the dye having the formula (III), $L^1$ in the formula (I) is preferably composed of 3 methines (the methines may be substituted) bonded to each other, and the mixing ratio between the dye having the formula (I) and the dye having the formula (III) preferably is in the range of 9:91 to 80:20 (dye having the formula (I):dye having the formula (III), by weight).

In order to enhance weathering resistance, it is preferred to use various dyes known as oxygen quenchers of singlet state, for example, compounds having the following formula (IV) or (V), in combination with the above-mentioned dye(s):

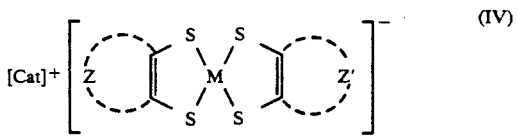

(IV)

wherein [Cat]$^+$ is a non-metallic cation such as tetraalkyl nonium; M is a transition metal atom such as Ni; and each of Z and Z' is an atom group for completing a 5-membered heterocyclic ring or 6-membered aromatic ring such as 2-thioxo-1,3-dithiol ring or a benzene ring which may be substituted.

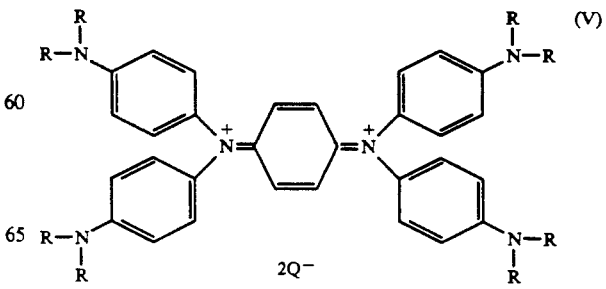

(V)

wherein R is an alkyl group which may have one or more substituents; and Q is the same anion as indicated by $X_a{}^{p-}$ in the formula (I).

Examples of the quencher represented by the above formula (IV) or (V) include PA-1006 (trade name, available from Mitsui Toatsu Fine Co., Ltd.) and IRG-023 (trade name, available from Nippon Kayaku Co., Ltd.).

Formation of the recording layer can be conducted by dissolving the above-mentioned dye (and the above-mentioned quencher, binder, etc., if desired) in a solvent to prepare a coating solution, coating the solution over the surface of the substrate, and drying the coated layer of the solution.

Examples of the solvents employable for preparing the coating solution for the formation of the dye recording layer include esters such as ethyl acetate, butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexane; ethers such as tetrahydrofuran, ethyl ether and dioxane; alcohols such as ethanol, n-propanol, isopropanol and n-butanol; and fluorine-containing solvents such as 2,2,3,3-tetrafluoropropanol.

The coating solution may further contain various additives such as an antioxidant, a UV-absorbent, a plasticizer and a lubricant according to the purpose.

A binder may be contained in the coating solution. Examples of the binders include natural organic polymer materials such as gelatin, cellulose derivative, dextran, rosin and rubber; and synthetic organic polymer materials such as hydrocarbon resins (e.g., polyethylene, polypropylene, polystyrene, polyisobutylene and chlorinated polyethylene), vinyl resins (e.g., polyvinyl chloride, polyvinylidene chloride and polyvinyl chloride/polyvinyl acetate copolymer, polyvinyl alcohol, butyral resin), acrylic resins (e.g., polymethyl acrylate and polymethyl methacrylate), and precondensates of thermosetting resins (e.g., epoxy resin, rubber derivative and phenol/formaldehyde resin).

In the case of using a binder for the formation of the recording layer, a ratio of the dye to the binder is generally in the range of 0.01 to 99% by weight, preferably in the range of 1.0 to 95% by weight. The coating solution prepared as above generally has a concentration of the dye in the range of 0.01 to 10% by weight, preferably 0.1 to 5% by weight.

The recording layer may have either single-layer structure or multi-layer structure, and in any case, the thickness of the recording layer is in the range of 200 to 3,000 Å, preferably 500 to 2,500 Å. Further, the recording layer may be provided on one surface of the substrate or both surfaces of the substrate.

The coating solution can be coated on the substrate utilizing conventional coating methods such as spray coating, spin coating, dip coating, roll coating, blade coating, doctor roll coating and screen printing.

In the information recording medium of the invention, a reflecting layer is preferably provided on the recording layer for the purpose of enhancing the reflectance in the information-reproduction stage.

A light-reflecting material employable for the reflecting layer is a material having a high reflectance to a laser beam. Examples of the light-reflecting materials include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi; and stainless steel. Cr, Ni, Pt, Cu, Ag, Au, Al and stainless steel are preferred. These materials can be employed singly or in combination. Alloys thereof can be also employed.

The reflecting layer can be formed on the recording layer using the above-mentioned light-reflecting material according to a known method such as deposition, sputtering or ion plating. The thickness of the reflecting layer is generally in the range of 100 to 3,000 Å.

On the reflecting layer, a protective layer may be provided to physically and chemically protect the recording layer. The protective layer may be provided also on the surface of the substrate where the recording layer is not provided for the purpose of improving physical resistance and moisture resistance.

As materials of the protective layer, there can be mentioned inorganic materials such as SiO, $SiO_2$, $MgF_2$, $SnO_2$ and $Si_3N_4$; and organic materials such as thermoplastic resins, thermosetting resins and UV-curable resins.

The protective layer can be formed, for example, by laminating a plastic film having been obtained by extrusion processing of a plastic material on the recording layer (or a reflecting layer) and/or the substrate via an adhesive layer. Otherwise, the protective layer can be provided thereon utilizing vacuum deposition, sputtering, coating, etc. In the case of using a thermoplastic resin or a thermosetting resin as a material of the protective layer, the resin is dissolved in an appropriate solvent to prepare a coating solution, the coating solution is coated over the recording layer and/or the substrate, and the coated layer of the solution is then dried to form a protective layer. In the case of using a UV-curable resin, the resin per se or a solution of the resin in an appropriate solvent is coated over the recording layer and/or the substrate, and the coated layer of the solution is irradiated with ultraviolet rays to cure the layer so as to form a protective layer. The coating solution for the formation of a protective layer may further contain a variety of additives such as an antistatic agent, an antioxidant and a UV-absorbent according to the purpose.

The thickness of the protective layer is generally in the range of 0.1 to 100 μm.

The information recording medium of the invention may be a single plate type having the above-described structure, or may be a combined-type in which two substrates each having the above-described structure are combined using an adhesive in such a manner that the recording layers on the substrates are positioned inside to face each other. Otherwise, an information recording medium of air-sandwich type can be prepared by using two of disc-shaped substrates, at least one of them having the above-described structure, and combining them by way of a ring-shaped inner spacer and a ring-shaped outer spacer.

The optical disc obtained as above and having a markedly high reflectance and excellent recording and reproducing characteristics can keep desired reflectance, even if a quencher of singlet state which is generally used for improving resistance to light is added to the optical disc. When the quencher is added to a conventional optical disc, the reflectance of the optical disc generally decreases. However, the reflectance of the information recording medium according to the invention is prominently high, namely, approx. 80%, so that even if the quencher is added to the information recording medium, the high reflectance can be maintained, and thereby the recorded information can be reproduced by a commercially available CD player. Hence, an optical disc showing both of high reflectance and high resistance to light can be also obtained.

Recording of information and reproduction of the recorded information using the above-described information recording medium can be made, for example, in the following manner.

The information recording medium is irradiated with a light for recording information (i.e., recording light) such as a semiconductor laser beam from the substrate side under rotation of the medium at a fixed linear speed (case of CD format signals: 1.2-1.4 m/sec) or a fixed angular speed. In the optical disc having a reflecting layer, it is presumed that formation of cavities on the interface between the recording layer and the reflecting layer (this formation of cavities is accompanied by distortion of any of the recording layer and the reflecting layer or both of them) which is apt to occur when the sublimation temperature of the dye is low, distortion of the substrate which is apt to occur when the sublimation temperature of the dye is high, discoloration of the recording layer, variation of the recording layer in the association condition, etc., are brought about under irradiation with the recording light, and thereby the reflectance of the optical disc is changed so as to record information on the optical disc. In the optical disc not having a reflecting layer, pits are generally formed on the recording layer to record information. As the recording light, a semiconductor laser beam having a wavelength region of 750 to 850 nm is generally employed.

Reproduction of the recorded information can be carried out by irradiating the information recording medium with a semiconductor laser beam from the substrate side under rotation of the medium at the same fixed linear speed as described above and detecting the reflected light.

Examples of the present invention are given below, but those examples by no means restrict the invention. The examples include examples of synthesis of the compounds having the formulas (I) and (II) according to the invention.

EXAMPLE 1

Synthesis of Compound I-4

4.58 g of 5,6-dichloro-1-ethyl-2-methylbenzimidazole was dissolved in 25 ml of acetone. To the resulting solution was then added 3 ml of α-bromopropiophenone and the resulting mixture was heated for 100 minutes under reflux.

Acetone was removed from the mixture through distillation, and the mixture was heated to 100° C. for 1 hour. To the mixture was then added 100 ml of acetone and the mixture was stirred to produce colorless crystals. The colorless crystals were separated from the mixture through filtration. The crystals were washed with acetone and dried. A yield of the crystals was 5.4 g.

The crystals were added to an aqueous solution of 1.3 g of sodium carbonate in 60 ml of water, and the resulting mixture was heated to 80° C. on a steam bath.

The mixture was allowed to stand for cooling, and produced crystals were separated from the mixture through filtration. The crystals were then washed with water to obtain 4.8 g of colorless crystals. Thereafter, the crystals were recrystallized from 600 ml of methanol, to obtain 2 g of 6,7-dichloro-4-ethyl-1-methyl-2-phenylpyrrolo[1,2-a]benzimidazole in the form of colorless needle crystals.

1 g of the obtained crystals were dissolved in a mixture of 20 ml of acetonitrile and 0.3 g of monohydrate of p-toluenesulfonic acid. To the resulting solution was added 1 ml of 1,3,3-trimethoxypropene, and the resulting mixture was heated for 5 minutes under reflux. The mixture was allowed to stand for cooling, and produced crystals were separated from the mixture through filtration. The crystals were then washed with 25 ml of acetonitrile to obtain 0.75 g of crystals of Compound I-4 (melting point: 247°-249° C.).

EXAMPLE 2

Synthesis of Compound 18

To 2.57 g of 5,6-dichloro-1-isopropyl-2-methylbenzimidazole were added 1.52 ml of α-bromopropiophenone and 1 ml of anisole, and the mixture was heated for 2 hours on a steam bath. Then, to the mixture was added 50 ml of acetone. A produced crystals were separated from the mixture through filtration, then to the crystals were added 40 ml of 2% aqueous solution of sodium carbonate, and the resulting mixture was heated for 80 minutes on a steam bath. After the mixture was allowed to stand for cooling, produced crystals were separated from through filtration. The crystals were then washed with water to obtain 6,7-dichloro-4-isopropyl-1-methyl-2-phenylpyrrolo[1,2-a]benzimidazole.

To 0.6 g of the crystals were added 11 ml of acetonitrile, 0.17 g of monohydrate of p-toluenesulfonic acid and 0.6 ml of 1,3,3-trimethoxypropene, and the mixture were heated for 15 minutes under reflux. After the resulting mixture was allowed to stand for cooling, produced crystals were separated from the mixture through filtration. The crystals were then washed with a small amount of acetonitrile, to obtain 1.2 g of Compound I-18 (melting point: 167° C.).

Examples of the information recording medium according to the invention and comparison examples are given below.

EXAMPLE 3

In 100 cc of 2,2,3,3-tetrafluoropropanol (formula: $HCF_2CF_2CH_2OH$) were dissolved 2.0 g of the aforementioned cyanine dye (dye number: I-45) and 0.2 g of a diimmonium dye (trade name: IRG-023, available from Nippon Kayaku Co., Ltd.) as a quencher, to prepare a coating solution for the formation of a dye recording layer.

On a disc-shaped polycarbonate substrate having been provided with a tracking guide (outer diameter: 120 mm, inner diameter: 15 mm, thickness: 1.2 mm, track pitch: 1.6 μm, width of groove: 0.5 μm, depth of groove: 900 Å) was coated the above-obtained coating solution by means of spin coating at 1,000 r.p.m., and the substrate with a coated layer was then dried for 30 seconds to form a recording layer having a thickness of 1,300 Å on the substrate.

Thus, an information recording medium consisting of a substrate and a recording layer was prepared.

EXAMPLE 4

The procedures of Example 3 were repeated except that a reflecting layer having a thickness of 1,300 Å was further formed on the recording layer by means of DC sputtering of Au and a protective layer having a thickness of 3 μm was furthermore formed on the reflecting layer by coating a UV-curable resin (trade name: 3070, available from Three Bond Co., Ltd.) over the reflecting layer by means of spin coating at 1,500 r.p.m. and curing the coated layer under irradiation with ultraviolet rays by the use of a high-voltage mercury lamp.

Thus, an information recording medium was prepared.

EXAMPLE 5

The procedures of Example 4 were repeated except for using 2 g of the aforementioned cyanine dye (dye number: I-4) as a dye instead of 2 g of the cyanine dye I-17, to prepare an information recording medium.

EXAMPLE 6

The procedures of Example 5 were repeated except for using both 0.4 g of the cyanine dye I-4 and 1.6 g of the aforementioned cyanine dye (dye number: III-1) as a dye instead of 2 g of the cyanine dye I-4, to prepare an information recording medium.

EXAMPLE 7

The procedures of Example 6 were repeated except that a coating solution for the formation of a dye recording layer was prepared without adding the diimmonium dye, to prepare an information recording medium.

EXAMPLE 8

The procedures of Example 6 were repeated except that a substrate having a groove depth of 1,600 Å was used instead of the substrate having a groove depth of 900 Å, a coating solution for the formation of a dye recording layer was prepared by varying the amount of the cyanine dye I-4 from 0.4 g to 1.0 g and the amount of the cyanine dye III-1 from 1.6 g to 1.0 g, and the thickness of the recording layer was varied from 1,300 Å to 2,000 Å, to prepare an information recording medium.

EXAMPLE 9

The procedures of Example 6 were repeated except for using the aforementioned cyanine dye (dye number: III-6) instead of the cyanine dye III-1, to prepare an information recording medium.

EXAMPLE 10

The procedures of Example 6 were repeated except for using the aforementioned dye (dye number: I-18) instead of the cyanine dye I-4, to prepare an information recording medium.

COMPARISON EXAMPLE 1

The procedures of Example 7 were repeated except that a coating solution for the formation of a dye recording layer was prepared by varying the amount of the aforementioned dye III-1 from 1.6 g to 2.0 g without using the cyanine dye I-4, to prepare an information recording medium.

COMPARISON EXAMPLE 2

The procedures of Comparison Example 1 were repeated except that a coating solution for the formation of a dye recording layer was prepared by further adding 0.2 g of the above-mentioned diimmonium dye (trade name: IRG-023, available from Nippon Kayaku Co., Ltd.) as a quencher, to prepare an information recording medium.

The composition of each coating solution for the formation of a dye recording layer obtained in the above examples and comparison examples are set forth in Table 1.

TABLE 1

|  | Material [by weight] | | |
|---|---|---|---|
|  | Dye I | Dye III | Quencher |
| Example 3 | I-45 [100] | — | IRG023 [10] |
| Example 4 | I-45 [100] | — | IRG023 [10] |
| Example 5 | I-4 [100] | — | IRG023 [10] |
| Example 6 | I-4 [20] | III-1 [80] | IRG023 [10] |
| Example 7 | I-4 [20] | III-1 [80] | — |
| Example 8 | I-4 [50] | III-1 [50] | IRG023 [10] |
| Example 9 | I-4 [20] | III-6 [80] | — |
| Example 10 | I-18 [20] | III-1 [80] | IRG023 [10] |
| Com. Ex. 1 | — | III-1 [100] | — |
| Com. Ex. 2 | — | III-1 [100] | IRG023 [20] |

Evaluation of Information Recording Medium

1) Reflectance

Each of the above-obtained information recording media was irradiated with a light having a wavelength of 780 nm from the substrate side to measure reflectance on the nonrecorded area of each medium using a spectrophotometer (produced by Hitachi, Ltd.).

2) C/N

Each of the above-obtained information recording media was irradiated with a semiconductor laser beam having a wavelength of 780 nm under the conditions of a fixed linear speed of 1.3 m/sec and a recording power of 7 mW, to record a signal having a modulation frequency of 720 kHz (duty: 33%) on each medium. The recorded signal was reproduced under the condition of a reproducing power of 0.5 mW, to measure C/N of the reproduced signal using a spectrum analyzer (TR4135, produced by Advantest Co., Ltd.).

The results are set forth in Table 2.

TABLE 2

|  | Reflectance (%) | C/N (dB) |
|---|---|---|
| Example 3 | 35 | 54 |
| Example 4 | 56 | 48 |
| Example 5 | 86 | 47 |
| Example 6 | 81 | 49 |
| Example 7 | 80 | 50 |
| Example 8 | 82 | 49 |
| Example 9 | 81 | 50 |
| Example 10 | 80 | 50 |
| Com. Ex. 1 | 73 | 50 |
| Com. Ex. 2 | 69 | 50 |

As is evident from the results set forth in Table 2, the optical disc (Example 3) having a recording layer prepared using a cyanine dye of the invention having absorption maximum on a relatively longer wavelength side showed reflectance and C/N of high level. Thus, it has been confirmed that the cyanine dye can be satisfactorily employed as a dye for optical discs. The optical disc (Example 4) having a reflecting layer on the above-mentioned recording layer had a relatively high reflectance and was hardly reduced in C/N. The optical disc (Example 5) having a recording layer prepared using a dye of the invention having absorption maximum on a relatively shorter wavelength side and further having a reflecting layer on the recording layer had a markedly high reflectance and was hardly reduced in C/N. The optical discs (Examples 6 to 10), each having a recording layer prepared using a combination of a specific cyanine dye of the invention (e.g., cyanine dye used in Example 5) and a dye having absorption maximum on the longer wavelength side than the wavelength of the cyanine dye, had a markedly high reflectance and maintained C/N of high level. Accordingly, it was possible to maintain a reflectance of high level even when a quencher was added to the optical disc, as shown in the optical discs of Examples 5, 6, 8 and 10.

On the other hand, the optical disc (Comparison Example 1) using only a dye having benzoindolenine structure which is generally known as a dye having high reflectance and excellent recording and reproducing characteristics exhibited lower reflectance than the optical discs of Examples, and such low reflectance was unsatisfactory in reproduction of the recorded information using a commercially available CD player. Therefore, in the case of the optical disc (Comparison Example 2) obtained by adding a quencher to the optical disc of Comparison Example 1 for the purpose of improving resistance to light, the reflectance of the optical disc was lower than 70%.

Examples of the optical filter prepared by using the cyanine dye according to the invention are given below.

EXAMPLE 11

Preparation of Optical Filter 0.1 g of the Compound I-4 was dissolved in 10 ml of 2,2,3,3-tetrafluoro-1-propanol. The resulting solution was coated over a glass plate through spin coating to prepare an optical filter. A absorption spectrum of the optical filter measured by means of a spectrophotometer (Hitachi automatic spectrophotometer 340 type), had the absorption maximum at 708 nm. The transmittance of the optical filter at 780 nm was 59%.

From the results, it was confirmed that the optical filter was useful for cutting off near infrared rays.

EXAMPLES 12 & 13

Preparation of Solution-type Optical Filter 0.1 g of the Compound I-4 and 0.1 g of the Compound I-18 were each dissolved in 100 ml of methanol, and each of the resulting solutions was introduced into a rectangular cell made of glass. Each of the solutions contained in the cell was blue, and the absorption maximum of each solution was 626 nm. From the results, it was confirmed that the solution-type optical filters were useful for cutting off a light having a wavelength of approx. 626 nm.

We claim:

1. An information recording medium comprising a substrate and a recording layer for recording information by means of a laser beam which is provided on the substrate, in which said recording layer contains a cyanine dye having the formula (I):

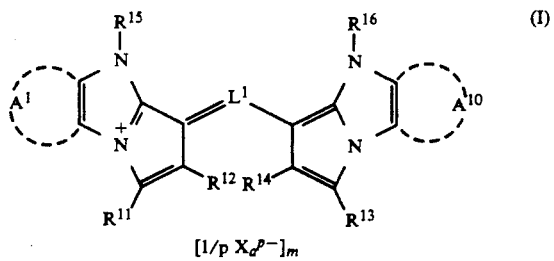

wherein each of $A^1$ and $A^{10}$ is an atom group for completing an aromatic ring which may have one or more substituents; $L^1$ is a methine group which may have one or more substituents or a trivalent connecting group of conjugated 3, 5 or 7 methines which may have one or more substituents; each of $R^{11}$, $R^{12}$, $R^{13}$ and $R^{14}$ is a hydrogen atom, or an alkyl, phenyl, acyl, alkoxy or 5- or 6-membered heterocyclic group which may have one or more substituents; each of $R^{15}$ and $R^{16}$ is an alkyl group which may have one or more substituents and said one of substituents may have an anionic moiety; $X_d{}^{p-}$ is an anion; p is 1, 2 or 3; m is 1 or 0; and m is 0 when $R^{15}$ or $R^{16}$ has a substituent having an anionic moiety.

2. The information recording medium as claimed in claim 1, wherein each of $A^1$ and $A^{10}$, $R^{11}$ and $R^{13}$, $R^{12}$ and $R^{14}$, and $R^{15}$ and $R^{16}$ in the formula (I) is the same as each other, each of $A^1$ and $A^{10}$ is an atom group for completing a benzene ring which has one or more substituents or a naphthalene ring which may have one or more substituents, and each of $R^{11}$, $R^{13}$, $R^{12}$ and $R^{14}$ is a hydrogen atom, an alkyl group which may have one or more substituents or a phenyl group which may have one or more substituents.

3. The information recording medium as claimed in claim 1, wherein a reflecting layer is provided on the recording layer.

4. The information recording medium as claimed in claim 1, wherein the recording layer comprises a mixture of a cyanine dye having the above formula (I) and a dye having absorption maximum on the longer wavelength side than the absorption maximum of the cyanine dye.

* * * * *